April 12, 1932. C. H. KIRBY 1,853,624
HEAT CONTROL VALVE
Filed Dec. 12, 1927  2 Sheets-Sheet 1
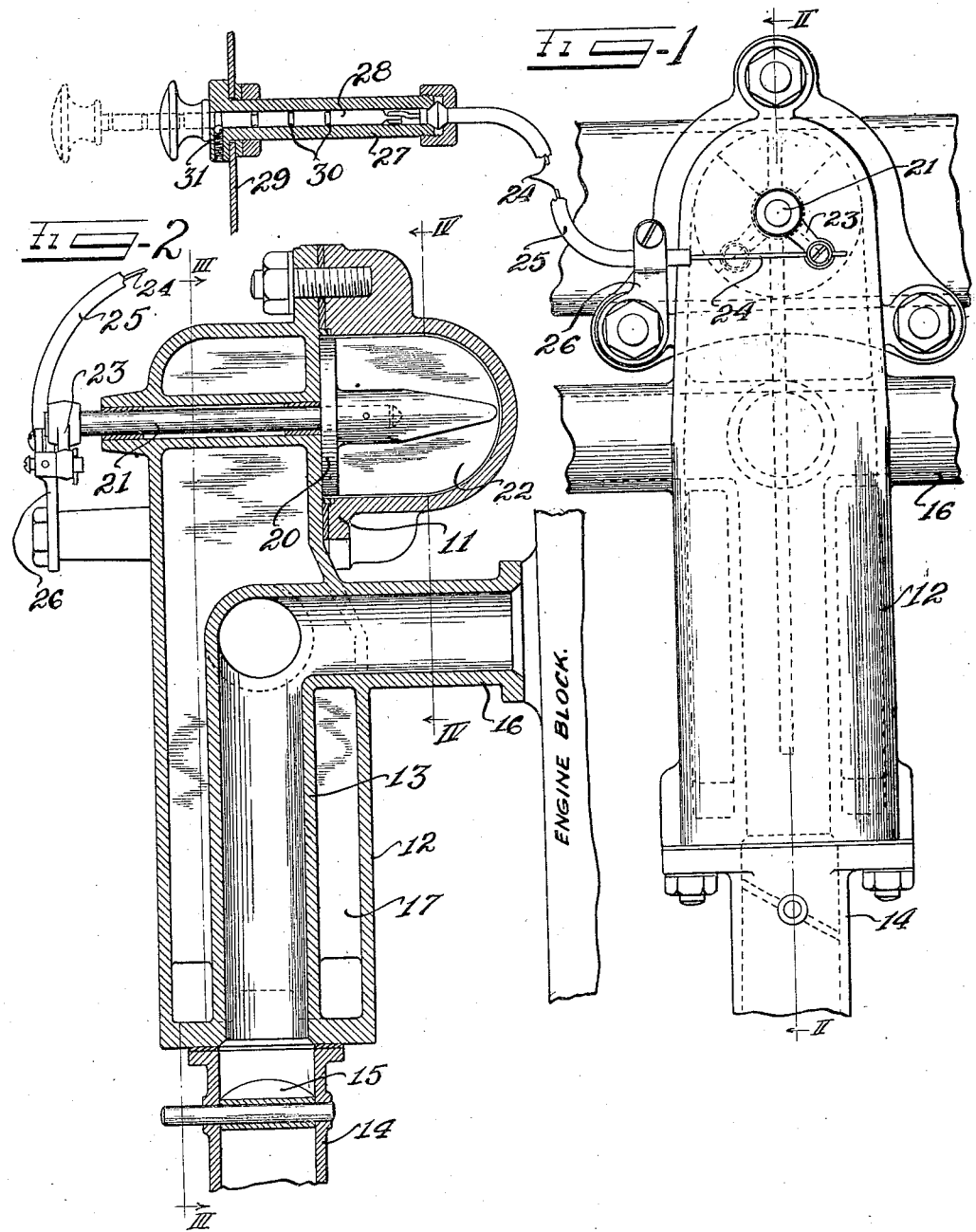
Inventor
Charles H. Kirby April 12, 1932. C. H. KIRBY 1,853,624
HEAT CONTROL VALVE
Filed Dec. 12, 1927 2 Sheets-Sheet 2
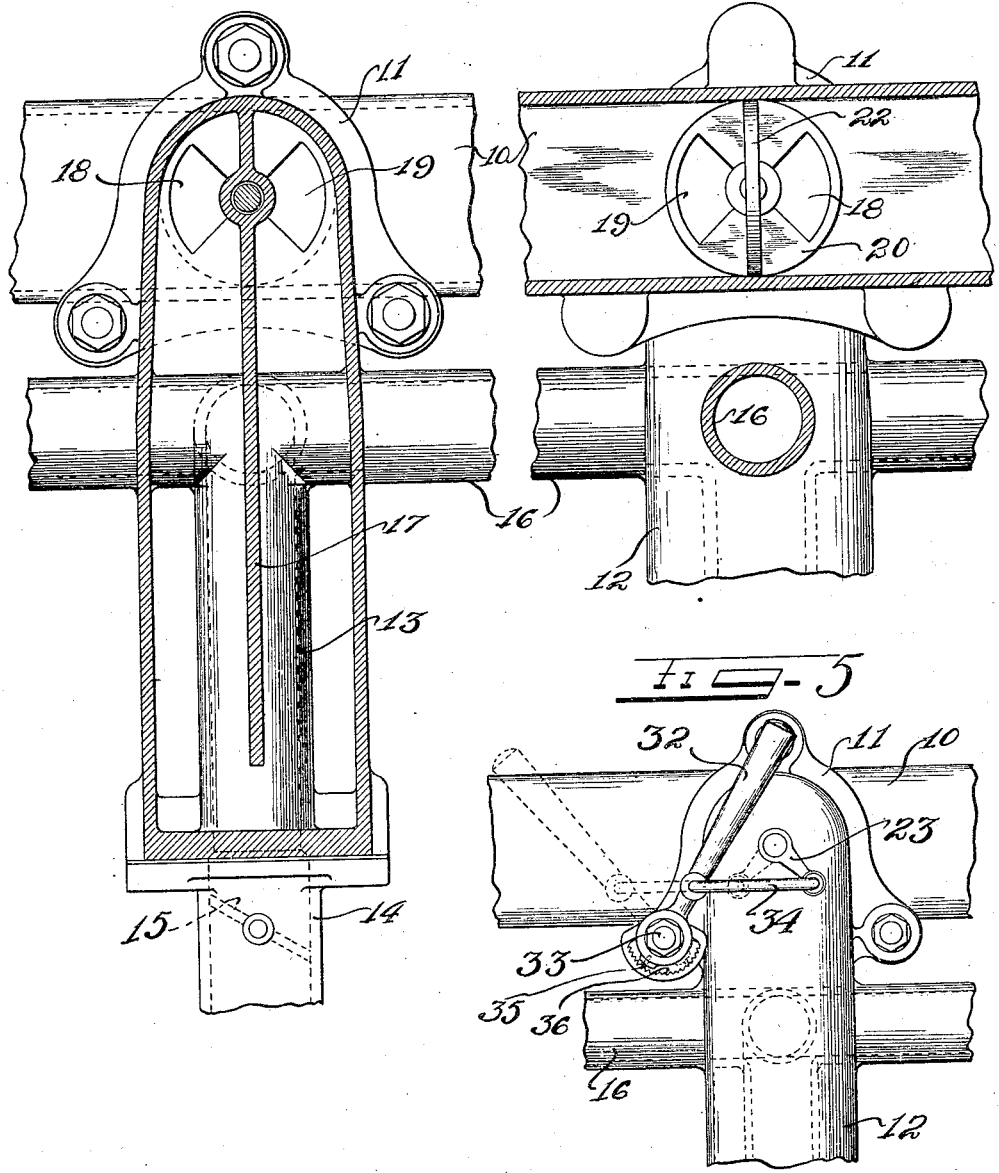
Inventor
Charles H. Kirby
by Atty Patented Apr. 12, 1932

1,853,624

UNITED STATES PATENT OFFICE

CHARLES H. KIRBY, OF FLINT, MICHIGAN, ASSIGNOR TO MARVEL CARBURETER COMPANY, OF FLINT, MICHIGAN, A CORPORATION OF ILLINOIS

HEAT CONTROL VALVE

Application filed December 12, 1927. Serial No. 239,374.

This invention relates to an improved form of exhaust gas bypass heating jacket for the intake manifold of an internal combustion engine.

It is an object of this invention to provide an improved structure of the type described comprising an adjustable heat control for bypassing varying amounts of exhaust gases through a jacket on the intake manifold in accordance with the varying conditions of operation of the engine. The vaporizing of fuel in the intake manifold at times extracts so much heat as to cause freezing of condensate on the surface of an unheated intake manifold, this frost being evidence that the proper vaporization of the fuel requires a large amount of heat. However, a fixed supply of heat is undesirable for the reason that a sufficient supply for one set of conditions, such as air temperature, power output, and speed, is entirely unsuited for variations in these conditions so that a readily adjustable supply of heat to a jacketed manifold is a highly desirable feature which is incorporated in the present invention, which comprises a bypass jacket surrounding the uptake of the intake manifold together with a valve controlling inlet and outlet ports in the jacket and at the same time acting to bypass the exhaust gases through the jacket when the ports are open.

It is another object of this invention to provide an improved and simplified intake manifold heater than can be cheaply manufactured and installed.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary elevation of exhaust and intake manifolds incorporating the features of this invention.

Figure 2 is a central vertical section of Figure 1 with parts in elevation.

Figure 3 is a section on the line III—III of Figure 2.

Figure 4 is a section on the line IV—IV of Figure 2.

Figure 5 is a fragmentary elevation of a modified form of manual control for the bypass valve.

As shown on the drawings:

An exhaust manifold 10 is provided with a flanged side opening 11 to which is bolted a bypass jacket 12 integral with and surrounding the uptake 13 from a carbureter connection 14 having a throttle valve 15; the intake manifold also having side branches 16 extending beyond the walls of the jacket. The jacket 12 is provided with a central partition 17 extending nearly to the bottom thereof, ports 18 and 19 opening into the exhaust manifold on either side of the partition so that the bypass path of the exhaust gases comprises entry at one of the ports 18 or 19, thence downwardly on one side of the partition, around the lower edge thereof, and upwardly on the other side, exiting back into the exhaust manifold through the other of the ports 18 or 19. A segmentally apertured disk 20 is carried by a shaft 21, this disk being adapted to simultaneously cover and uncover the two ports 18 and 19. An outstanding plate 22 is also carried by the disk, this plate serving to substantially block the exhaust manifold between the bypass ports when the ports are fully open, thus causing a nearly complete diversion of the exhaust gases through the jacket.

Two forms of manual control for the bypass valve are shown in Figures 1 and 5. In both forms a lever 23 is pinned to the outer end of the valve shaft to partially rotate the same, and in Figures 1 and 2 this lever is connected to a stiff wire 24 incased in a flexible but not extensible tube 25 clamped adjacent the lever by a bracket 26. The other end of the tube is attached to a guide 27 for a push and pull rod 28, the guide being mounted in a control panel or dash 29 convenient to the operator. The combination of the wire and incasing tube is commonly termed a Bowden wire. The push and pull rod 28 is provided with a number of grooves 30 and a spring detent 31 is mounted in the guide 27 to engage in one of the grooves to hold the rod in its adjusted position.

The modified control of Figure 5 utilizes a hand lever 32 pivoted on one of the studs 33 holding the jacket 12 against the exhaust pipe flange 11, this hand lever 32 having a link 34 extending to the valve shaft lever 23. In order to assure maintenance of the adjustment a spring detent 35 in the pivoted end of the hand lever 30 rides over a serrated surface within a fixed quadrant 36.

It will thus be seen that I have produced an improved and simplified manually controlled exhaust gas bypass heating jacket for intake manifolds.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In combination with the exhaust and intake manifolds of an internal combustion engine, an opening in the exhaust manifold, a jacket for the intake manifold extending to and covering said opening, a central partition in said jacket extending nearly the full length thereof, inlet and outlet ports on either side of said partition and opening into the exhaust manifold, a segmentally apertured disk rotatably mounted on the exhaust side of said ports, an outstanding plate secured to said disk and adapted to substantially close the exhaust manifold between the ports when said disk is turned to open said ports, manually adjustable means adapted to rotate said disk, and means adapted to yieldingly maintain an adjustment when once set.

2. In combination with the exhaust and intake manifolds of an internal combustion engine, an opening in the exhaust manifold, a jacket for the intake manifold extending to and covering said opening, inlet and outlet ports opening into the exhaust manifold, a segmentally apertured disk rotatably mounted on the exhaust side of said ports, an outstanding plate secured to said disk and adapted to substantially close the exhaust manifold between the ports when said disk is turned to open said ports, manually adjustable means adapted to rotate said disk, and means adapted to yieldingly maintain an adjustment when once set.

In testimony whereof I have hereunto subscribed my name.

CHARLES H. KIRBY.